United States Patent [19]

Marcq

[11] Patent Number: 4,601,486

[45] Date of Patent: Jul. 22, 1986

[54] TRACTOR HITCH

[75] Inventor: Gilbert Marcq, Beauchamp, France

[73] Assignee: Massey-Ferguson Services N.V., Curacao, Netherlands Antilles

[21] Appl. No.: 672,658

[22] Filed: Nov. 19, 1984

[30] Foreign Application Priority Data

Nov. 29, 1983 [GB] United Kingdom ............... 8331824

[51] Int. Cl.⁴ .......................................... A01B 59/043
[52] U.S. Cl. ................................ 280/460 A; 172/450; 280/461 A; 280/474
[58] Field of Search .......... 280/461 A, 460 A, 460 R, 280/456 A, 446 A, 479 A, 499, 474, 490 A; 172/450, 439, 678

[56] References Cited

U.S. PATENT DOCUMENTS

| | | | |
|---|---|---|---|
| 2,746,770 | 5/1956 | Sorensen | 280/460 A |
| 2,775,180 | 12/1956 | DuShane | 172/450 |
| 2,935,147 | 5/1960 | Edmar et al. | 172/450 |
| 4,265,464 | 5/1981 | Lange | 280/460 A |
| 4,470,613 | 9/1984 | Sykes | 280/461 A |

Primary Examiner—John J. Love
Assistant Examiner—M. Dukes
Attorney, Agent, or Firm—Robert L. Farris

[57] ABSTRACT

A tractor hitch in which a pair of lower implement attachment links (10) are stabilized by a pair of sway blocks (16) with rubbing surfaces (16a) which cooperate with the links or rubbing blocks (30) on the links to control the amount of sidesway of the links. Each sway block (16) is mounted adjacent its upper end on the tractor by a mounting device (17,18,19,20,21,24) which allows the block to pivot generally in a transverse plane relative to the tractor and adjustment devices (25,26,27,27',28) are provided at the lower end of each sway block to allow the angle of pivot of the block to be continuously adjusted to set the amount of permitted side sway of the links when the links contact the lower ends of the blocks. The spacing (X) between the rubbing surfaces (16a) at the upper ends of the sway block (16) is also adjustable and shock cushioning (31) may be included in the mounting device of the sway blocks to cushion the links against sideways loading arising from loads carried by the links.

6 Claims, 4 Drawing Figures

TRACTOR HITCH

TECHNICAL FIELD

This invention relates to tractor hitches and in particular to hitches, hereinafter referred to as being of the type specified, having a pair of lower implement attachment links pivotable in a vertical sense between a lowered working position and a raised transport position, and a pair of sway blocks spaced transversely of the tractor with rubbing surfaces for cooperation with the links (or rubbing blocks carried threby) to control the amount of sideways sway of any implement attached to the links whether in their working or transport position.

A number of problems are encountered with hitches of the type specified above. For example, such hitches cannot readily be adjusted to vary the amount of sway. Also a given hitch cannot readily be adjusted to provide the desired sway control for different categories of implements or even to cater for the width variations in the same category of implement supplied by different implement manufacturers.

Further, excessively large shock-loadings can sometimes be imposed on the tractor and/or lower links particularly when a fully-mounted heavy implement suddenly sways sideways when being carried in the raised transport position of the hitch.

DISCLOSURE OF THE INVENTION

It is an object of the present invention to provide an improved form of tractor hitch of the type specified which mitigates one or more of the above problems.

Thus according to the present invention there is provided a tractor hitch having a pair of lower implement attachment links pivotable in a vertical sense between a lowered working position and a raised transport position, a pair of sway blocks spaced transversely of the tractor with rubbing surfaces for cooperation with the links or rubbing blocks carried thereby to control the amount of sideways sway of any implement attached to the links whether in their working or transport position, mounting means adjacent one end of each sway block to mount the sway block on the tractor and to allow the block to pivot in a generally transverse plane relative to the tractor, and first adjustment means adjacent the other end of each sway block to allow the angle of pivot of the block to be continuously adjusted within a given angular range to provide adjustment of the amount of side sway of the links when in contact with said other ends of the sway blocks.

In a preferred arrangement the mounting means includes second adjustment means which allows the transverse spacing between the rubbing surfaces at said one ends of the sway blocks to be varied.

It will be appreciated that the first adjustment means enables the hitch to be fully adjustable to give no sway in the transport position and a wide range of different sway setting when in the work position. The additional provision of the second adjustment means extends the adjustment range of the hitch still further and enables the hitch to be readily adjusted to cater for the width variations in different manufacturers implements of the same category and to cater for different categories of implements.

Preferably, each mounting means also allows limited pivotting about a generally vertical axis to allow each sway block to pivot so that rubbing surface remains generally parallel to the contacting surface on the link or rubbing block. This arrangement reduces wear by ensuring a larger area of contact between the rubbing surfaces and the links or rubbing blocks.

The present invention also provides a hitch of the type specified in which each sway block is mounted on the tractor via shock-cushioning means designed to cushion the tractor and links against shock sideways loading arising from loads carried by the links.

The cushioning means may comprise one or more belleville washers which are compressed during shock sideways loading to provide said cushioning action.

Where the above described adjustable mounting means is employed the cushioning means can conveniently be included in the mounting means to give a particularly advantageous hitch arrangement.

DESCRIPTION OF THE DRAWINGS

The present invention will now be described, by way of example only, with reference to the accompanying drawings which show a single tractor rear hitch installation and in which.

BEST MODE OF CARRYING OUT INVENTION

Figure 1:
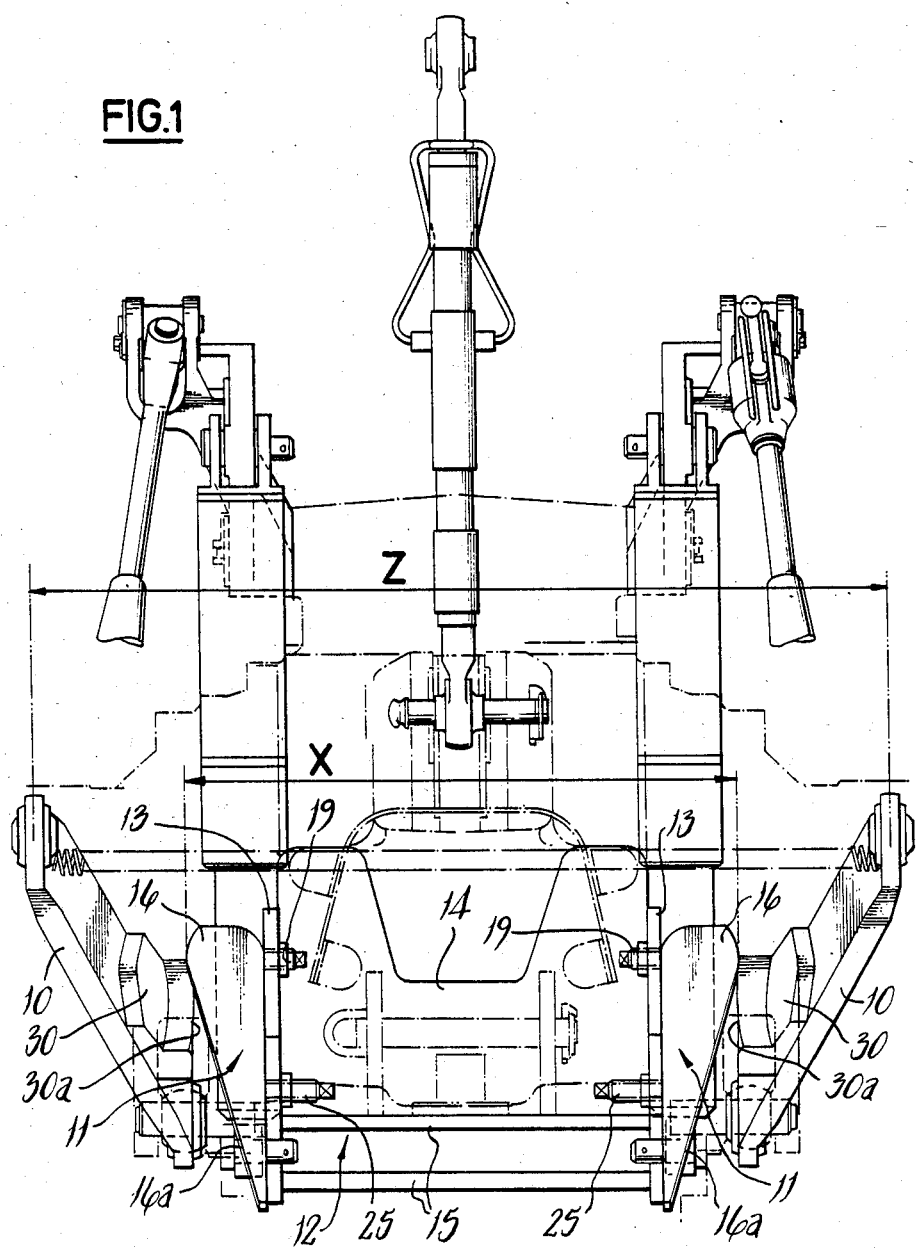
FIG. 1 is a rear view of a tractor showing the hitch installation.
Figure 2:
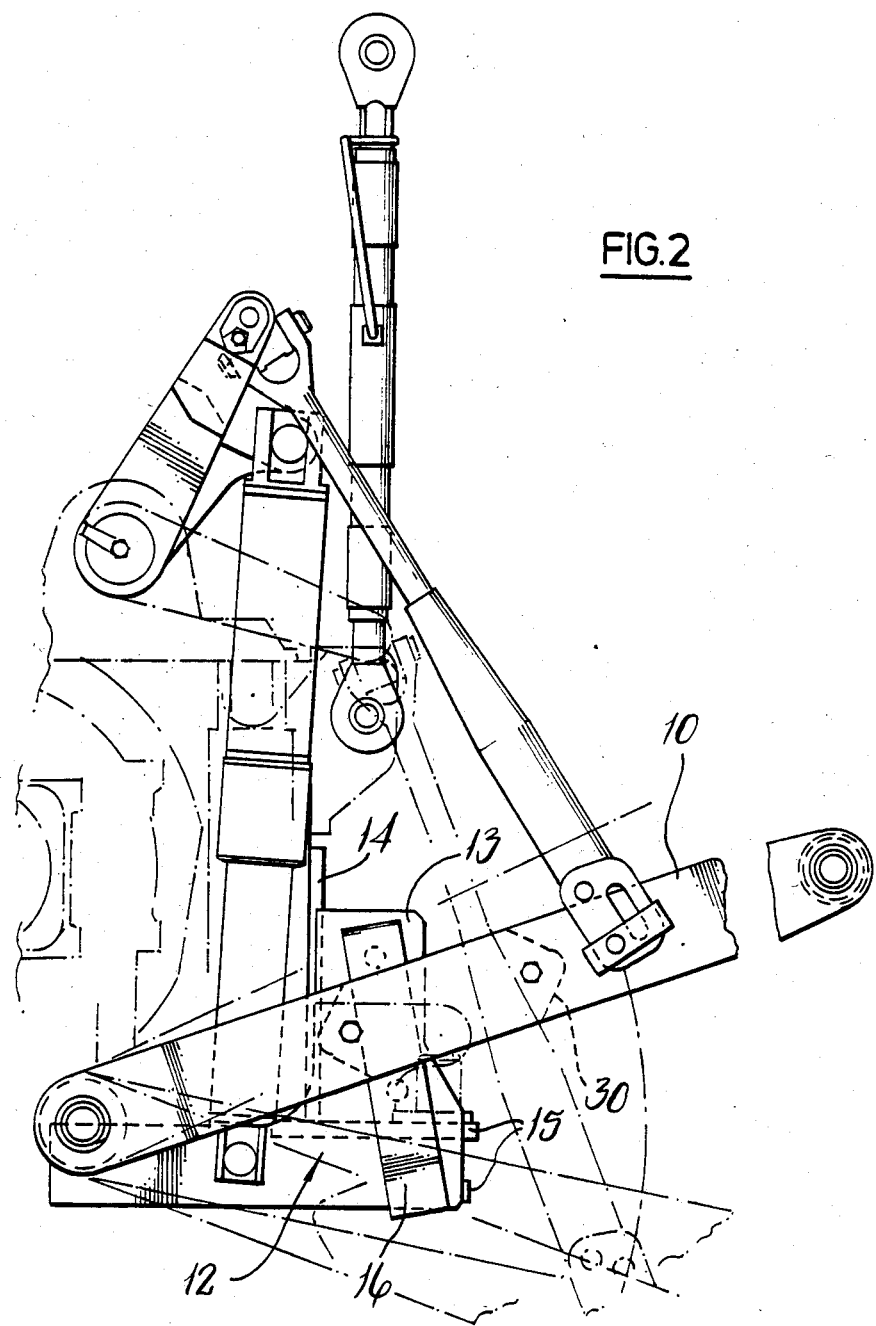
FIG. 2 is a side view of the installation of FIG. 1.

Referring to FIGS. 1 and 2 a tractor three point hitch includes draft links 10 which are provided with adjustable sway control devices 11. The sway control devices comprise adjustable sway blocks 16, which are shown in more detail in FIG. 3, and rubbing blocks 30 which are mounted on the inside of the draft links. The sway blocks 16 are mounted on a welded sub-frame 12 which includes two vertically extending side plates 13, a transversely extending back plate 14 and a pair of vertically spaced horizontal plates 15 between which a towing hook (not shown) may be supported.

Figure 3:
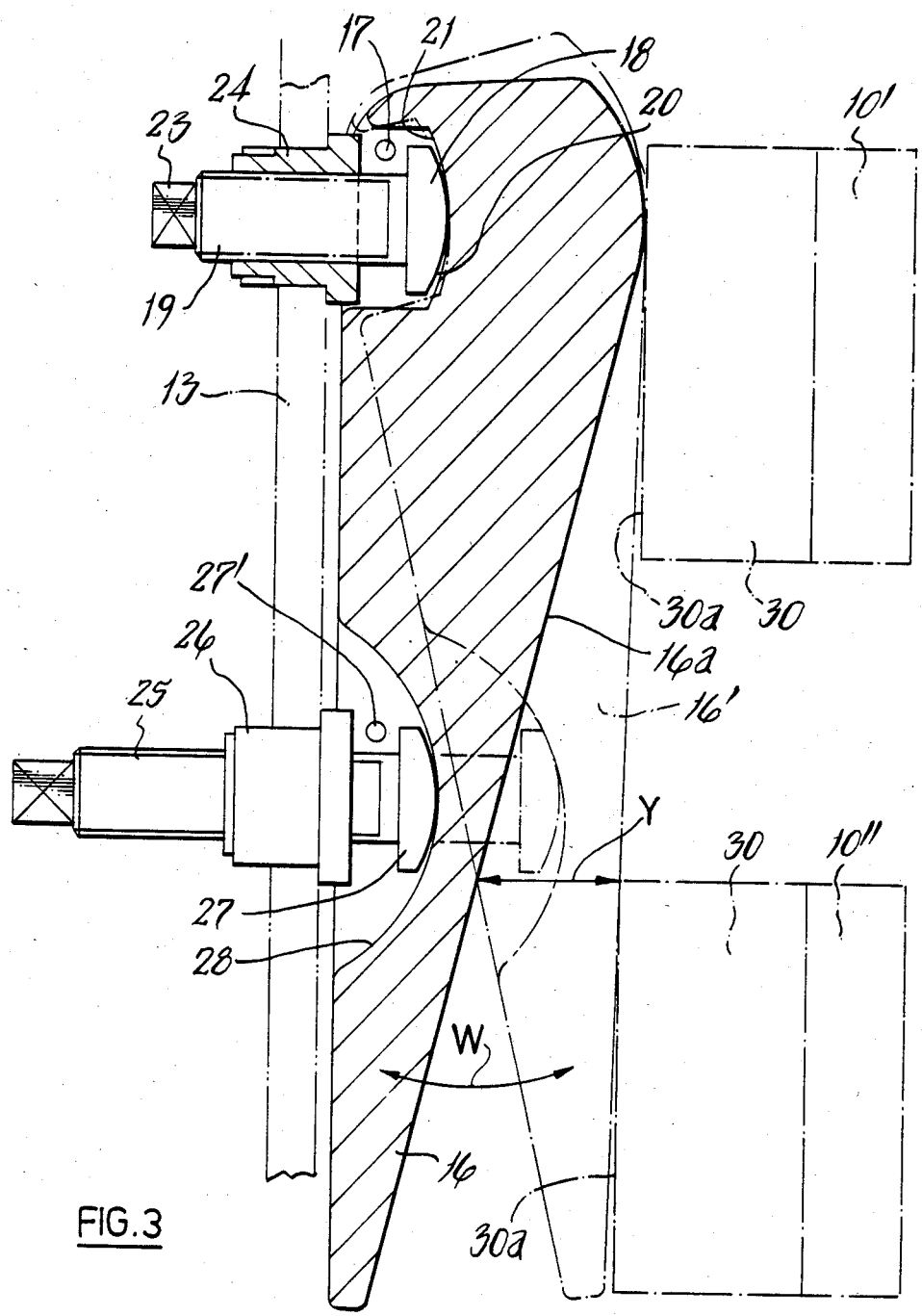
FIG. 3 shows the sway block mounting details on a larger scale.

In the transport position 10' of the draft links shown in FIG. 3, the links are adjacent the upper ends of the sway blocks and in the working position 10" the links are adjacent the lower ends of the sway blocks. Each sway block 16 is of tapering form and is pivotally mounted adjacent its upper end on the associated side plate 13. The pivotal mounting is provided by a mounting means in the form of a pin 17 which is carried in the sway block 16 and which loosely locates the head 18 of an adjustment bolt 19 with clearance as can be seen in FIG. 3. The head 18 has an end surface 20 of part spherical form which mates with a part-spherical surface 21 provided in a bolt-head-receiving recess 22 adjacent the upper end of the sway block across which the pin 17 extends.

This arrangement enables the sway block to pivot about a generally horizontal axis (i.e., the pin 17) extending fore and aft of the tractor indicated by arrow W in FIG. 3 and to a limited extent about a generally vertical axis resulting in movement between head 18 and surface 21 which is allowed by the clearance between pin 17 and the head 18 to enable the rubbing surface 16a of each sway block to be maintained generally parallel and in contact with surface 30a on the associated rubbing block. The inner end 23 of adjustment bolt 19 is of square or hexagonal form to facilitate rotation of the bolt within a threaded bush 24 mounted on side plate 13. Rotation of bolt 19 adjusts the transverse spacing between the pivotal mounting means of the two sway blocks 16 thus enabling the spacing 'X' (see FIG. 1) between the outer surfaces of the upper ends of sway blocks 16 to be adjusted so that the side sway of the draft links 10 when in their transport position 10' to be correctly adjusted for a wide range of different implements.

The amount of side sway permitted when the draft links are in their working position 10" is a function of the clearance 'Y' of FIG. 3. If the sway blocks are provided and held in the dotted position 16' of FIG. 3, no side sway is possible when in the working position. A further rotatable adjustment bolt 25 and support bush 26 are provided to enable each sway block to be pivoted as indicated by arrow W thus adjusting clearance Y and hence the permitted side sway at draft link positions below the transport position. The head 27 of bolt 25 is part-spherical and co-operates with a part-spherical recess 28 in the lower half of each sway block. The head 27 is retained in the recess 28 by a pin 27'.

As is well known the horizontal spacing Z (see FIG. 1) between the mounting balls of different implements can vary significantly. For example, on category I implements the distance Z is approximately 682 mm and on category II implements the distance Z is approximately 825 mm. Also, even on the same nominal category of implement, the distance Z may vary from one manufacturer to another. The amount of adjustment possible using bolts 19 and 25 has been designed to be sufficient to enable the stabilizing device to be adjusted to cater for both the category I and II implements supplied by all implement manufacturers using suitably sized rubbing blocks 30.

Figure 4:
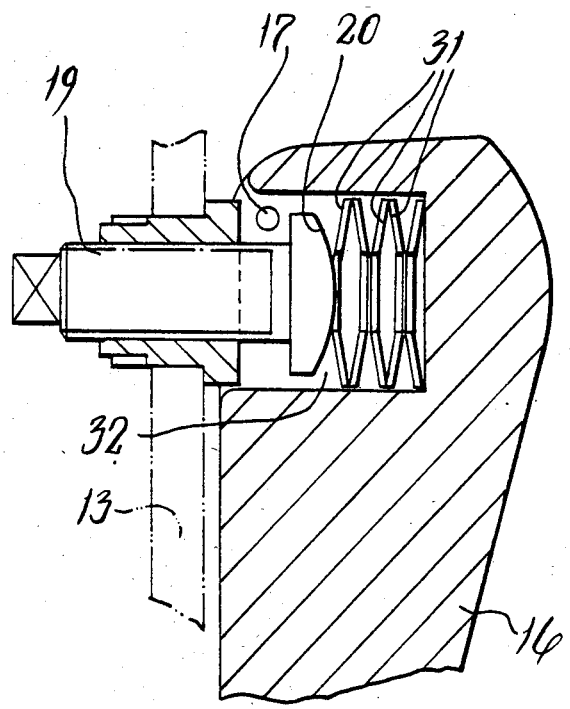
FIG. 4 shows details of a sway block mounting which includes cushioning against side loads.

FIG. 4 shows a modified form of upper bolt mounting which includes a cushioning means in the form of a stack of belleville washers 31 positioned between the head 18 of the bolt and a cylindrical recess 32 provided in the sway block 16. The sway block is again pivoted on pin 17 during adjustment as described above and the belleville washers slide over the part-spherical surface 20.

The belleville washers provide a cushioning or shock absorbing capability to cushion the linkage and those parts of the tractor to which the linkage is connected against the high shock loads which can arise if, for example, a heavy implement when raised into the transport position suddenly sways sideways. As will be seen in the arrangement of FIG. 4, the Belleville washers are arranged so that stack gives the maximum possible deflection before the washers are fully compressed.

As will be appreciated the design and number of washers used is dependent on the maximum weight of implement which the hitch is designed to carry and is easily arrived at by simple testing.

Since the upper ends of sway blocks of the form shown in FIG. 4 have a limited degree of resilient mounting in a horizontal sence, as described above, this further assists in accommodating manufacturing inaccuracies and variations in the size of implements of a given category.

I claim:

1. A tractor hitch having a pair of lower implement attachment links pivotable in a vertical sense between a lowered working position and a raised transport position, a pair of sway blocks spaced transversely of the tractor with rubbing surfaces for cooperation with the links to control the amount of sideways sway of any implement attached to the links whether in their working or transport position, mounting means adjacent one end of each sway block to mount the sway block on the tractor and including pivot means to allow the block to pivot in a generally transverse plane relative to the tractor, first adjustment means adjacent the other end of each sway block to allow the angle of pivot of the block to be continuously adjusted within a given angular range to provide adjustment of the amount of side sway of the links when in contact with said other ends of the sway blocks, and second adjustment means included in said mounting means to allow the transverse spacing between the pivot means of the sway blocks to be varied in order that the hitch can cater for different sizes of implement.

2. A hitch according to claim 1 in which the mounting means also allows limited pivoting about a generally vertical axis to allow each sway block to pivot so each surface remains generally parallel to the contacting surface on the associated link.

3. A hitch according to claim 1 in which the mounting means for each sway block comprises an adjustment bolt having a head with a outer surface of part-spherical form which is received and located in a co-operating bolt-head-receiving recess in the sway block to allow the block to pivot relative to the tractor and having a shank which is received in screw-threaded engagement with a component carried by the tractor, the shank being provided with means for turning the bolt within the screw-threaded component thus displacing the head of the bolt and hence the sway block transversely relative to the tractor to provide said second adjustment means.

4. A hitch according to claim 3 in which shock cushioning means in the the form of one or more belleville washers act between the outer surface of the part-spherical head of the adjustment bolt and the bolt-head-receiving recess, said washers being arranged to be compressed to cushion the tractor and links against shock sideways loading arising from loads carried by the links.

5. A hitch according to claim 1 in which the first adjustment means for each sway block is provided by a further adjustment bolt having a head which is received in a further co-operating bolt-head-receiving recess in the sway block and having a shank which is received in screwthreaded engagement with a component carried by the tractor, the shank of the further adjustment bolt being provided with means for turning the bolt within the associated screw-threaded component thus displacing the head of the bolt and hence pivoting the sway block to adjust the amount of side sway.

6. A hitch according to claim 1 in which the mounting means includes a shock cushioning means in the form of one or more belleville washers which are compressed during shock sideways loading to cushion the tractor and links against shock sideways loading arising from loads carried by the links.

* * * * *